Feb. 4, 1941.  L. N. MESTRE  2,230,573
DIASCOPIC PROJECTION APPARATUS
Filed Dec. 20, 1937  2 Sheets-Sheet 1

Feb. 4, 1941.   L. N. MESTRE   2,230,573
DIASCOPIC PROJECTION APPARATUS
Filed Dec. 20, 1937   2 Sheets-Sheet 2

L. N. Mestre
inventor

By Glascock Downing & Seebold
Attys.

Patented Feb. 4, 1941

2,230,573

UNITED STATES PATENT OFFICE 2,230,573

DIASCOPIC PROJECTION APPARATUS

Louis Nicolas Mestre, Paris, France, assignor to Anciens Etablissements Barbier, Benard & Turenne, Paris, France, a French company Application December 20, 1937, Serial No. 180,906
In Luxemburg December 22, 1936

5 Claims. (Cl. 88—24)

My invention has for its main object a diascopic projection apparatus which is particularly simple to use and enables projections to be obtained on a screen, of transparent elements such as positives or negatives or the like of various dimensions and also, if desired, of views of the whole or of portions of the same elements.

A further object of my invention relates to the optical device which comprises at least two objectives corresponding to different magnifications and each of which is in general associated with a condenser which is co-axial with same for forming an optical system, the objectives and the condensers being carried by supports rotatable integral with each other about an axis so as to enable, in a single operation responsive to an appropriate control, one optical system to be substituted for another on the path of the luminous beam according to the dimensions of the element to be projected.

According to a preferred embodiment, the aforesaid supports are fast on a vertical pivot made of one or a plurality of parts which is remote from the optical axis and parallel with same, and all the condensers can preferably be mounted on a single plate-shaped support of which the positions of use are marked by spring stops or the like.

After the vertical luminous beam has passed through the element to be projected, it is deviated in the direction of the projection screen by an orientable mirror, one of the aforesaid objectives being always located on the path of the luminous beam after or before reflection on said mirror.

Other characteristics and advantages of my invention will moreover appear from the ensuing description made with reference to the accompanying drawings which are given solely by way of example and in which.

Figure 1:
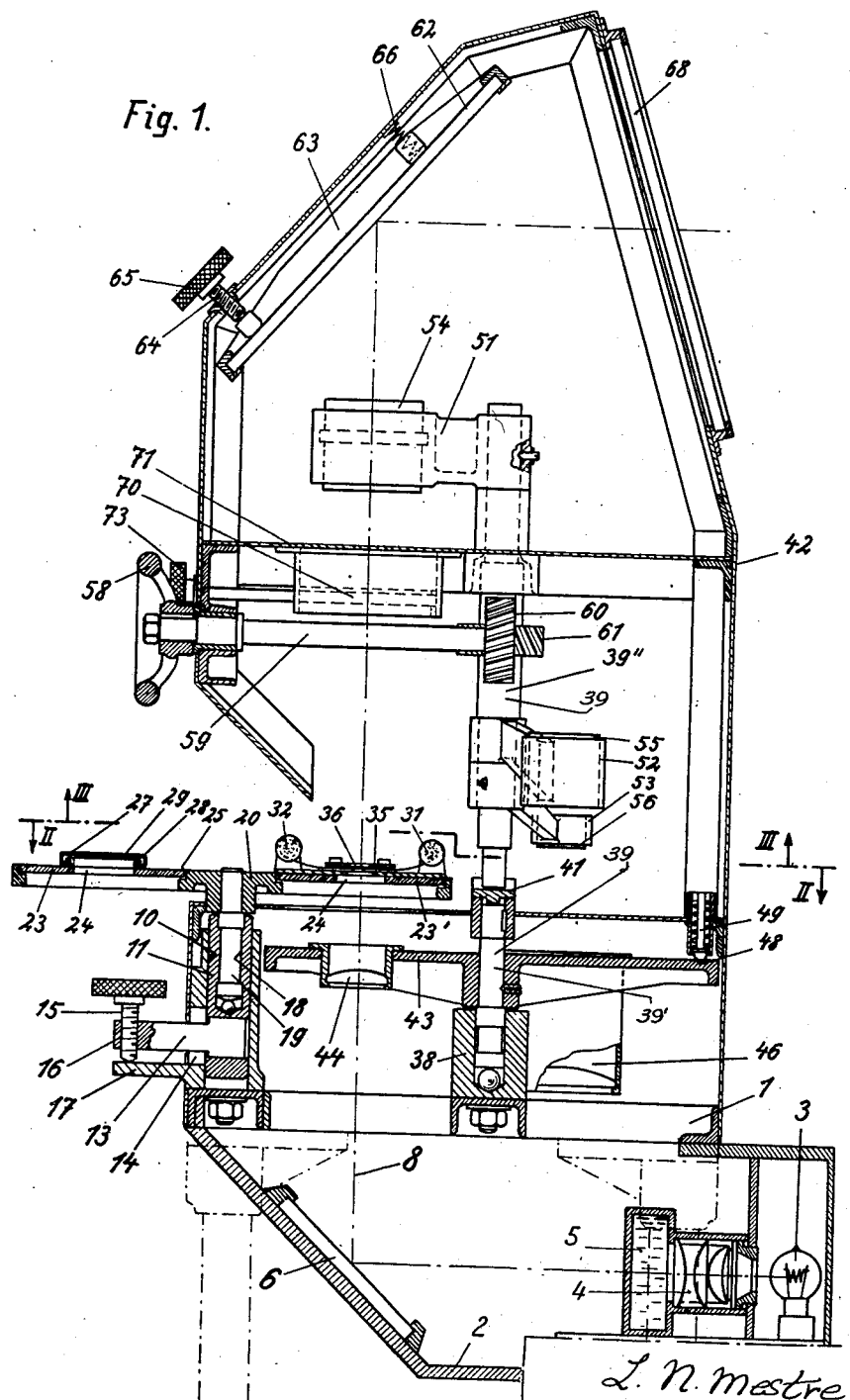
Fig. 1 is a sectional elevation of an apparatus according to my invention, the upper and lower parts of the figure being respectively sections along the lines I—I of Figs. 2 and 3.

According to the embodiment shown, the apparatus essentially comprises a base I carrying at its lower part an illuminating device enclosed in a housing 2. Said device is formed by a luminous source 3 which is arranged laterally relatively to the apparatus and illuminates, through a condenser 4 and a water tank 5, an inclined mirror 6 which reflects the incident luminous flux in an upwardly directed vertical luminous flux, the axis of which is shown by the chain dotted line 8 which will be called the optical axis of the apparatus.

Adjacent the extreme part of the housing 2 opposite the source 3, and above said part, the base is provided with a cylindrical or prismatic vertical housing 10 serving as a guide for a slide 11. The slide 11 moves in unison in its vertical displacements in the housing 10 with a lateral extension 13 projecting outwardly through a vertically elongated opening 14. An adjusting screw 15 having a knurled head is screwed into a hole 16 provided in said extension 13 and rests at its end on a bracket 17 fixed to the base 1. Said screw thus enables the height of the slide 11 to be adjusted relatively to the base.

Figure 2:
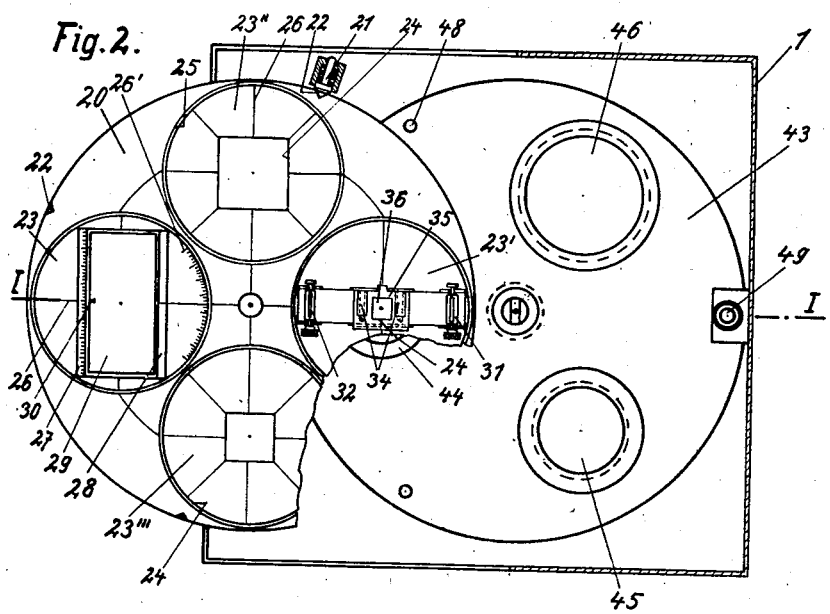
Fig. 2 is a section along the line II—II of Fig. 1.
Figure 3:
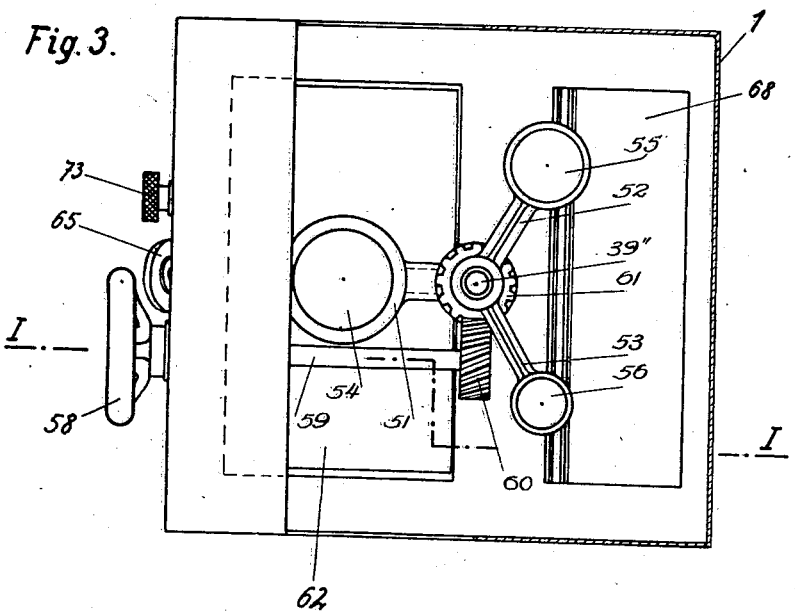
Fig. 3 is a section along the line III—III of Fig. 1, the diaphragm being assumed to be removed.

The slide 11 has a blind vertical cylindrical hole therein which opens at its upper part and serves as a housing for a pivot 19 at the upper part of which is fixed the horizontal carrier plate 20 which can be formed of transparent material and serves as a support for the elements to be projected, one of which is substituted for the other on the optical axis 8 by rotating said plate on itself, the pivot 19 then rotating in the housing 18. The different positions of the plate corresponding to the centering objects to be projected are marked (Fig. 2) by a spring stop 21 carried by the base I and co-operating with notches 22 provided on the edge of the plate 20.

The elements to be projected are carried by discs 23, 23', 23" . . . having therein a central opening 24 for the luminous rays to pass through and resting on the plate when same is made of transparent material or lodged in circular recesses 25 which are assumed to be four in number, provided in the plate 20. Said discs 23, 23' . . . are interchangeable and can rotate on themselves in their housing 25, their position being marked relatively to the plate 20 by means of polar lines 26 and graduations such as 26' on the disc 23 according to the orientation which it is desired to give the elements to be projected.

The disc 23 has been shown which is intended for the projection of the negatives or positives, and for this purpose it carries above its rectangular vertical opening 24 and along its large sides, two guides 27 and 28, one of which, 27, is graduated and along which can slide the negative or positive 29 to be projected, the frame of said negative or positive having a mark 30 intended to co-operate with said graduations. The negative or positive can similarly slide in a perpendicular direction and its position is marked in a similar manner.

The discs 23'' and 23''' have been assumed to be intended for negatives or positives of different dimensions.

With regard to the disc 23', it is shown as being appropriate for the projection of films and, for this purpose, it carries a film passing device formed by a feed roll 31 and a receiving roll 32 which are actuated by knurled knobs and between which the film 33 is resiliently pressed by means of springs 34 against the opening 24 by a plate 35 having a window 36 therein registering with said opening 24.

The base 1 carries substantially at its centre a bearing 38 for a vertical pivot 39 made in two parts 39' and 39'' coupled together at 41. The upper part 39' of the pivot 39 is located inside the frame 42 which is supported by the base 1 above same.

Immediately above the bearing 38 and below the plate 20, a support 43 is fixed on the part 39' of the pivot 39. Said support 43 carries a number of condensers, three, 44, 45 and 46 in the example shown, either of which are capable of being centred on the optical axis 8 by rotating the plate 43, the positions of use of which are marked by notches 48 provided in its surface and co-operating with a spring-pressed projection 49.

Above the plate 20 and at different heights, an objective carrying turret 51, 52, 53 for objectives 54, 55, 56 respectively concentric with the condensers 44, 45, 46, is rigid with the part 39'' of the pivot 39, each of the objective-condenser optical systems thus formed corresponding to a different magnification.

The rotation of the pivot 39 to which are secured the support 43 and the turret 51, 52 and 53 is controlled by a hand wheel 58 outside the frame 42 which rotates a rod 59 on which is fixed a gear wheel 60 meshing with a gear wheel 61 fast on the part 39'' of the pivot 39. This control could also be effected by a knob secured to the supports so as to increase the speed of substitution.

The optical unit is completed by an inclined plane mirror 62 carried at the upper part of the frame 42 and orientable by the pressure, on its inner surface 63, of the end of a screw 64 having a knurled head 65 on which said surface is pressed by a spring 66.

The slope of the mirror 62 is such that the incident vertical luminous flux having an axis 8 is reflected laterally through a glass 68 which closes the upper part of the frame 42, optionally after having passed through an objective, not shown, which is intended to be added to or substituted for one of the objectives 54, 55, 56, and is carried by a support fixed on the part 39'' of the pivot 39 and co-operates with a condenser such as 44, 45, 46. An iris diaphragm carried by a support 71 inside the frame 42 is interposed on the path of the luminous beam and is controlled by a knurled knob 73 which is outside the frame and is located beside the hand wheel 58.

It will be understood that for projecting an appropriate transparent element which is carried by a disc such as 23 resting on the plate 20, said element is brought to its centred position on the optical axis 8 by rotating the plate on itself through a suitable angle defined by the stop 21 penetrating into a notch 22 corresponding to the recess 25 of the plate 20, in which the aforesaid disc is arranged. The objective 54 of appropriate magnification for the size of said element and the condenser 44 associated with said objective are then centred on the optical axis by rotating the hand wheel 38, the projection 49 penetrating into a notch 48 defining the suitable position of the optical system.

The focussing is always effected, whatever be the optical system, by displacing the plate 20 by means of the knurled headed screw 15.

While I have described what I at present consider preferred embodiments of my invention, it will be obvious that various changes may be made without departing from my invention and I therefore aim in the appended claims to cover all such changes and modifications as fall within the true spirit and scope of my invention.

What I claim is:

1. In an apparatus for the diascopic projection of transparent elements, a lighting system creating a luminous beam centered on the axis of projection, an object-carrier for supporting a transparent element in the path of said luminous beam, a support arranged on the incident beam side of said object-carrier and rotatably mounted about an axis remote from the axis of projection, said support being provided with angularly spaced passages for the light at least one of which is formed by a condenser, the position of the axis of each of said passages relatively to the axis of rotation of the support being the same as that of said axis of rotation relatively to the axis of projection so that each of said passages can be selectively brought into axial register with said axis of projection, an objective carrying turret arranged on the emergent beam side of the object-carrier, that is to say on the other side of said object-carrier relatively to the aforesaid support, said turret being rotatable about an axis remote from the axis of projection and carrying objectives whereof the axes are angularly spaced and which are equal in number to the aforesaid light passages, the position of each of said last named axes relatively to the axis of rotation of the turret corresponding to the position of the axis of projection relatively to said last named axis of rotation so that each of said objectives can be brought into axial register with the axis of projection, and the optical features of said objectives being so determined that each of them forms an optical system associated with one of said light passages, a rigid connecting device connecting the support and the turret to each other so that they rotate integral, the angular distance between two successive passages and that between two successive objectives being in register and the relative position of the support and of the turret being so determined that each objective is in axial register with the axis of projection at the same time as the associated passages.

2. In an apparatus for the diascopic projection of transparent elements, a lighting system creating a luminous beam centred on the axis of projection, an object carrier for supporting a transparent element in the path of said luminous beam, a support arranged on the incident beam side of said object-carrier and rotatably mounted about an axis of rotation remote from the axis of projection and parallel with said latter axis, said support being provided with angularly spaced passages for the light having axes parallel with the axis of projection, and at least one of which is formed by a condenser, the distance between the axes of each of said passage and the axis of rotation of said support being equal to the distance between said axis of rotation and said axis of projection whereby said passages are adapted to be selectively centered on the projection axis, an objective carrying turret arranged on the emergent beam side of the object carrier, that is to say on the other side of said object carrier with reference to the said support, said turret being rotatable about the said axis of rotation and carrying objectives which are equal in number to the aforesaid light passages, and each of which is in axial coincidence with one of said passages, with which it forms in association an optical system, rigid connecting means between the support and the turret so that said pieces rotate integral whereby each optical system is adapted to be selectively brought in axial coincidence with the optical axis.

3. An apparatus for the diascopic projection as claimed in claim 1 wherein said axes are vertical.

4. An apparatus for the diascopic projection as claimed in claim 1 including further a hand control member and connecting means between said hand control member and said rigid connecting device arranged to control the rotation of said device.

5. In an apparatus for diascopic projection of transparent elements, a lighting system creating a luminous beam centred on the axis of projection, an object carrier plate rotatably mounted about an axis of rotation parallel with the axis of projection and remote from said latter, object supporting means mounted on said plate and spaced from said axis of rotation of a distance equal to the distance between said last named axis and said axis of rotation whereby said object supporting means are adapted to be brought selectively in axial coincidence with said axis of projection, a support arranged on the incident beam side of said object-carrier and rotatably mounted about an axis remote from the axis of projection, said support being provided with angularly spaced passages for the light, at least one of which is formed by a condenser, the position of the axis of each of said passages relatively to the axis of rotation of the support being the same as that of said axis of rotation relatively to the axis of projection so that each of said passages can be selectively brought into axial register with said axis of projection, an objective carrying turret arranged on the emergent beam side of the object-carrier, that is to say on the other side of said object-carrier relatively to the aforesaid support, said turret being rotatable about an axis remote from the axis of projection and carrying objectives whereof the axes are angularly spaced and which are equal in number to the aforesaid light passages, the position of each of said last named axes relatively to the axis of rotation of the turret corresponding to the position of the axis of projection relatively to said last named axis of rotation so that each of said objectives can be brought into axial register with the axis of projection, and the optical features of said objectives being so determined that each of them forms an optical system associated with one of said light passages, a rigid connecting device connecting the support and the turret to each other so that they rotate integral, the angular distance between two successive passages and that between two successive objectives being in register and the relative position of the support and of the turret being so determined that each objective is in axial register with the axis of projection at the same time as the associated passage.

LOUIS NICOLAS MESTRE.